(No Model.)
N. B. OUSLEY.
COTTON GIN.
No. 263,350. Patented Aug. 29, 1882.
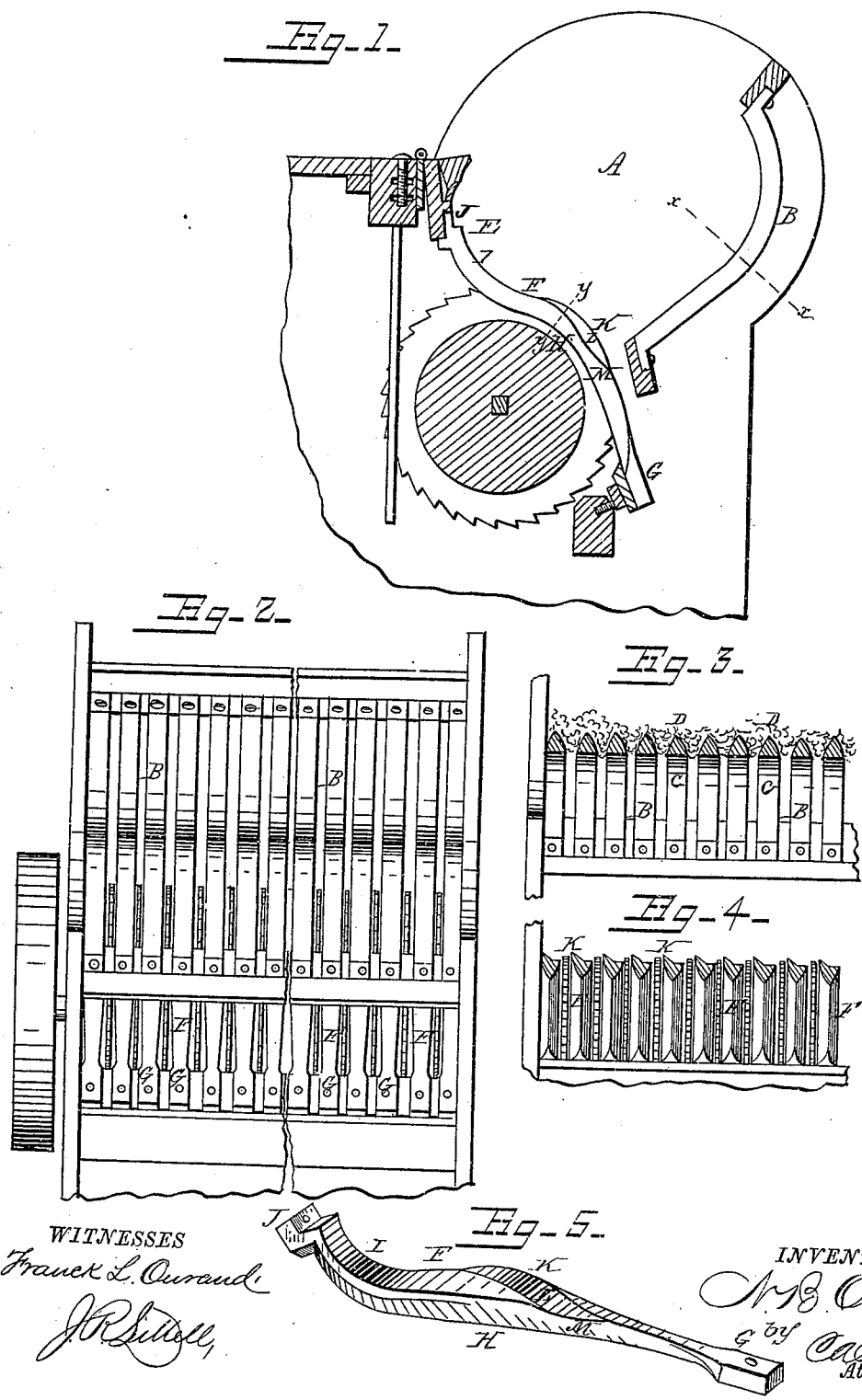

UNITED STATES PATENT OFFICE.

NEWDAYGATE B. OUSLEY, OF FORT VALLEY, GEORGIA.

COTTON-GIN.

SPECIFICATION forming part of Letters Patent No. 263,350, dated August 29, 1882

Application filed July 12, 1882. (No model.)

*To all whom it may concern:*

Be it known that I, NEWDAYGATE B. OUSLEY, of Fort Valley, in the county of Houston and State of Georgia, have invented certain new and useful Improvements in Cotton-Gins; and I do hereby declare that the following is a full, clear, and exact description of the invention, which will enable others skilled in the art to which it appertains to make and use the same, reference being had to the accompanying drawings, which form a part of this specification.

This invention relates to cotton-gins, and has for its object to provide simple, durable, inexpensive, and efficient means for more readily and thoroughly cleaning the seed and producing a better and more valuable product.

In the drawings, Figure 1 is a vertical longitudinal sectional view of a portion of a cotton-gin embodying my improvements; Fig. 2, an end view thereof; Fig. 3, a transverse sectional view on the line $x$ $x$, Fig. 1; Fig. 4, a like view on the line $y$ $y$, Fig. 1, taken through the incline on the rib; and Fig. 5, a perspective detail view of one of the breast-ribs.

Referring to the drawings, A designates the roll-box, the front of which is formed of ribs B, a space being left between the latter sufficiently large to allow all dirt, sand, &c., to pass through, and yet small enough to prevent any of the seed from falling out.

The openings between the ribs B enlarge from the top to the bottom of the roll-box to prevent any clogging of the roll. The ribs B are formed flat on their outer surface, as at C, and are beveled to a feather or sharp edge on their inside, as at D. Thus the sharp edge of the rib penetrates the roll, opening the same to a depth equal to the bevel of the rib, so as to allow all dirt and the like to sift out of the roll and pass off between the ribs. The said ribs also compress the cotton-roll into compact ridges, the saws being so arranged that at each successive revolution they will open the newly-formed ridges, thereby cleaning the seed of lint more effectually and ginning more rapidly. In lieu, however, of the ribs just described, the front of the roll-box may be formed of grated bars, wire-netting, and the like, the present form being simply shown as a preferable form of roll-box to be used in connection with my improved breast, which constitutes my invention.

To avoid the dust arising from the escape of the sand and dirt through the open front of the roll-box, the latter may be covered with cloth or a casing of wood or tin.

E designates the breast of the gin, the ribs of which, F, are curved from their lower ends, G, up, as at H, forming arcs which tally with the peripheries of the saws for some distance, as shown. The upper ends are also curved, as at I, and provided with the usual securing-shoulders, J. The segmental portion H of each breast-rib is formed with a thick raised side or flange, K, slightly higher than the teeth of the adjoining saw, from which extends a beveled shoulder, L, diagonally down across the rib, terminating at a point, M, lower than the raised portion K, and also slightly lower than the teeth of the adjoining saw. An inclined plane is thus formed at said segmental portion, which forces the seed, in passing out from the cotton-roll, down to the lower edge, M, in direct contact for some distance with the teeth of the saw, so as to effectually remove whatever lint may have remained on the seed. The seed is also caused by this construction of rib to run along the side of the saw-teeth and finally pass out in direct contact therewith.

I claim and desire to secure by Letters Patent—

1. A cotton-gin rib, curved from its lower end upward to form an arc corresponding with the periphery of the saw, when in use, and formed at said segmental portion with a beveled shoulder extending diagonally down across the rib and terminating at a point lower than said flange or side, and also slightly lower than the teeth of the adjoining saw, when in use, as set forth.

2. In combination with the saws of a cotton-gin, the herein-described cotton-gin ribs, curved from their lower ends upwardly to form arcs corresponding to the peripheries of the saws, said curved portions having raised sides or flanges slightly higher than the teeth of the adjoining saws, and beveled shoulders extending diagonally down across the ribs and terminating at points lower than said flanges or raised sides, and also slightly lower than the teeth of the adjoining saws, substantially as set forth.

In testimony that I claim the foregoing as my own I have hereto affixed my signature in presence of two witnesses.

NEWDAYGATE B. OUSLEY.

Witnesses:
J. F. TROUTMAN, Jr.,
W. E. BROWN.